US009790310B2

(12) United States Patent
Han et al.

(10) Patent No.: US 9,790,310 B2
(45) Date of Patent: Oct. 17, 2017

(54) METHOD FOR PREPARING ABS GRAFT COPOLYMER

(71) Applicant: LG CHEM, LTD., Seoul (KR)

(72) Inventors: Su Jeong Han, Daejeon (KR); Sun Haeng Chung, Daejeon (KR); Yoo Vin Kim, Daejeon (KR); Young-Min Kim, Daejeon (KR); Jin-Hyoung Lee, Daejeon (KR); Young-Hwan Jeong, Daejeon (KR); Jae Min Suk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 16 days.

(21) Appl. No.: 14/772,071

(22) PCT Filed: Sep. 30, 2014

(86) PCT No.: PCT/KR2014/009220
§ 371 (c)(1),
(2) Date: Sep. 1, 2015

(87) PCT Pub. No.: WO2015/047038
PCT Pub. Date: Apr. 2, 2015

(65) Prior Publication Data
US 2016/0222152 A1    Aug. 4, 2016

(30) Foreign Application Priority Data

Sep. 30, 2013 (KR) .................. 10-2013-0116330
Sep. 30, 2014 (KR) .................. 10-2014-0130678

(51) Int. Cl.
*C08F 279/04* (2006.01)

(52) U.S. Cl.
CPC .................. *C08F 279/04* (2013.01)

(58) Field of Classification Search
CPC .................. C08L 5/02; C08F 279/04
See application file for complete search history.

(56) References Cited

U.S. PATENT DOCUMENTS 4,301,264 A * 11/1981 Moore .................. C08F 6/006
526/65
4,703,090 A    10/1987 Ferraresi et al.
2002/0111435 A1    8/2002 Gasche et al.

FOREIGN PATENT DOCUMENTS

| CN | 101970570 A | 9/2011 |
|----|-------------|--------|
| EP | 0003957 B1 | 9/1982 |
| KR | 10-2009-0052364 A | 5/2009 |
| KR | 10-2012-0061173 A | 6/2012 |

OTHER PUBLICATIONS

Office Action from Chinese Patent Office for Application No. 201480011606.3, dated Nov. 1, 2016.
International search report for PCT/KR2014/009220 filed on Sep. 30, 2014.

* cited by examiner

*Primary Examiner* — Mark Kaucher

(57) ABSTRACT

The present invention relates to a method for preparing an ABS graft copolymer. According to the present invention, provided is a method for preparing an ABS graft copolymer capable of improving surface gloss by inducing the formation of bimodal particles through the formation of existing ABS resin particles and ABS resin particles having a relatively small diameter.

12 Claims, 2 Drawing Sheets

METHOD FOR PREPARING ABS GRAFT COPOLYMER

CROSS REFERENCE TO RELATED APPLICATIONS

The present application is a U.S. National Stage of International Patent Application No. PCT/KR2014/009220 filed Sep. 30, 2014, which claims priority to Korean application number KR 10-2013-0116330, filed on Sep. 30, 2013, and Korean application number KR 10-2014-0130678, filed on Sep. 30, 2014, which are incorporated by reference in their entirety.

TECHNICAL FIELD

The present invention relates to a method for preparing an acrylonitrile-butadiene-styrene (ABS) copolymer, and more particularly, to a method for preparing an ABS copolymer, which can improve the surface gloss of the ABS copolymer by inducing the formation of bimodal particles through the formation of conventional ABS resin particles and ABS resin particles having a relatively small particle size.

BACKGROUND ART

Generally, acrylonitrile-butadiene-styrene (ABS) graft copolymers are prepared by emulsion polymerization. Specifically, ABS graft copolymers are prepared by using polybutadiene latex (PBL) as a seed and graft-copolymerizing styrene-acrylonitrile (SAN) onto the seed.

Meanwhile, in acrylonitrile-butadiene-styrene (ABS) resin that is a general-purpose plastic resin that is most frequently used in televisions, refrigerators and vehicle interiors, consumers demand improvement in surface gloss. This is because people generally consider high-gloss products as high-grade products in televisions, refrigerators and vehicles.

For this reason, improvement in the gloss of general-purpose ABS resin is an important task for the purpose of differentiating the quality of the ABS resin from the quality of ABS resins manufactured by other companies.

PRIOR ART DOCUMENTS

Patent Documents

Korean Patent Laid-Open Publication No. 2005-0067838 (published on Jul. 5, 2005).

DISCLOSURE

Technical Problem

Therefore, the present invention has been made in view of the above problems in the prior art, and it is one object of the present invention to provide a method for preparing an acrylonitrile-butadiene-styrene (ABS) graft copolymer having improved gloss, and an ABS graft copolymer prepared by the method.

The above and other objects can be accomplished by the present invention described below.

Technical Solution

In accordance with one aspect of the present invention, provided is a method of preparing an acrylonitrile-butadiene-styrene (ABS) graft copolymer by graft-copolymerizing a vinyl aromatic monomer and a vinyl cyan monomer onto rubber latex, the method comprising the steps of: (1) adding, based on 100 parts by weight of the total weight of the rubber latex, the vinyl aromatic monomer and the vinyl cyan monomer, 0.0001-0.1 parts by weight of an aqueous polymerization initiator to 50-80 wt % (on a solid basis) of the rubber latex, and mixing the polymerization initiator with the rubber latex to prepare a first mixture; (2) adding 5-10 wt % of the total amount of a monomer emulsion mixture, prepared by emulsifying 20-50 wt % of a second mixture of the vinyl aromatic monomer and the vinyl cyan monomer with, based on 100 parts by weight of the total weight, 0.01-10 parts by weight of an emulsifier, all at once to the first mixture, initiating polymerization of the monomers, and then adding the remaining amount of the monomer emulsion mixture in a continuous manner, and performing polymerization of the monomers; and (3) adding, based on 100 parts by weight of the total weight, 0.0001-0.5 parts by weight of an assistant polymer initiator to the material resulting from step (2) when the degree of conversion of the monomers reaches 80-90%, and performing polymerization of the monomers.

In an embodiment, the amount of water that is used in the method for preparing the ABS graft copolymer, that is, the polymerization process, may be 90-200 parts by weight, 90-150 parts by weight or 90-120 parts by weight based on 100 parts by weight of the total weight of the rubber latex and the monomers.

In an embodiment, 70-95 wt % of the water that is used in the polymerization process may be used in the preparation of the first mixture, and the remaining amount of the water may be used in the preparation of the monomer emulsion mixture.

Advantageous Effects

As apparent from the foregoing, the present invention advantageously provides an ABS graft copolymer having improved surface gloss by using different polymerization initiators at different time points during polymerization, adding a portion of an emulsion mixture of a vinyl aromatic monomer and a vinyl cyan monomer, which are to be grafted onto rubber latex, all at once to the rubber latex, and adding the remainder emulsion mixture in a continuous manner.

BEST MODE

Figure 1:
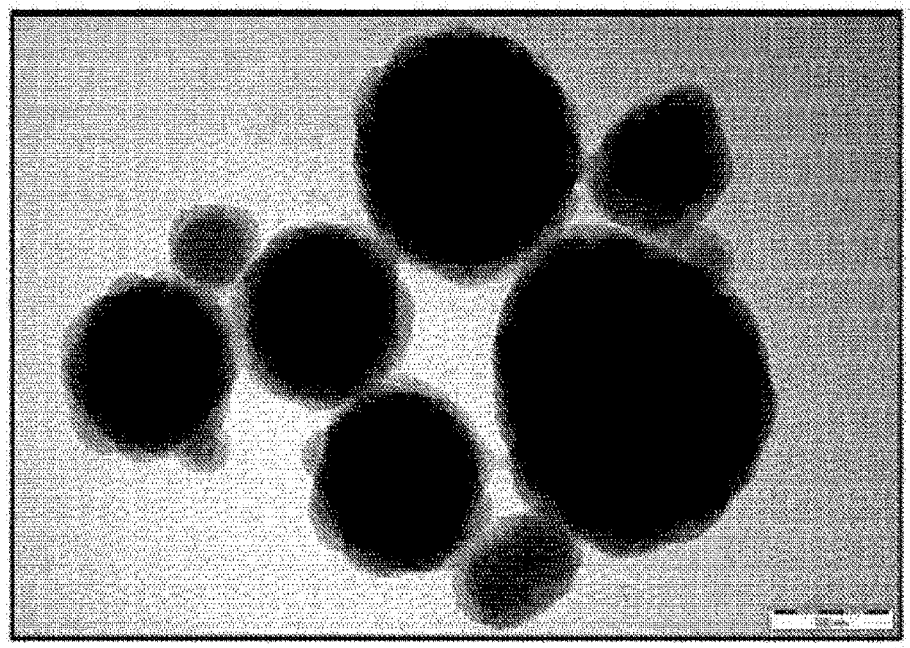
FIG. 1 is a transmission electron microscope (TEM) photograph of an ABS graft copolymer prepared in Example 1 of the present invention.

Hereinafter, a method for preparing a graft copolymer according to the present invention and a graft copolymer prepared by the method will be described in detail with reference to exemplary embodiments.

As used herein, the term "ABS graft copolymer" refers to a copolymer prepared by graft-copolymerizing a vinyl aromatic monomer and a vinyl cyan monomer onto diene rubber. In an embodiment, the ABS graft copolymer may be an acrylonitrile-butadiene-styrene graft copolymer.

The present invention provides a method of preparing an acrylonitrile-butadiene-styrene (ABS) graft copolymer by graft-copolymerizing a vinyl aromatic monomer and a vinyl cyan monomer onto rubber latex, the method comprising the steps of: (1) adding, based on 100 parts by weight of the total weight of the rubber latex, the vinyl aromatic monomer and the vinyl cyan monomer, 0.0001-0.1 parts by weight of an aqueous polymerization initiator to 50-80 wt % (on a solid basis) of the rubber latex, and mixing the polymerization initiator with the rubber latex to prepare a first mixture; (2) adding 5-10 wt % of the total amount of a monomer emulsion mixture, prepared by emulsifying 20-50 wt % of a second mixture of the vinyl aromatic monomer and the vinyl cyan monomer with, based on 100 parts by weight of the total weight, 0.01-10 parts by weight of an emulsifier, to the first mixture, initiating polymerization of the monomers, and then adding the remaining amount of the monomer emulsion mixture, and performing polymerization of the monomers; and (3) adding, based on 100 parts by weight of the total weight, 0.0001-0.5 parts by weight of an assistant polymer initiator during polymerization of the monomers at the time point when the degree of conversion of the monomers reaches 80-90%, and performing polymerization of the monomers.

In an embodiment, 5-10 wt % of the total amount of the monomer emulsion mixture may be added all at once.

In an embodiment, step (1) that is the first polymerization step comprises adding 5-10 wt % of the total amount of the monomer emulsion mixture, and then elevating the internal temperature of the reactor to a temperature between 70° C. and 80° C. to initiate polymerization.

In an embodiment, the remaining amount of the monomer emulsion mixture may be added continuously.

Particularly, in the present invention, continuous addition of the remaining amount of the monomer emulsion mixture is started at the time point at which the content of polymer particles calculated using the degree of conversion of the monomers is 5-10 wt %. In this case, the following effect is obtained. That is, the monomers added all at once react for a certain period of time to create an increased number of reaction sites other than those of the rubber latex, and thus an increased number of particles is formed by the monomers that are added continuously after the time point at which the content of polymer particles calculated using the degree of conversion of the monomers is 5-10 wt %, thereby improving the gloss of the resulting ABS graft copolymer.

In an embodiment, continuous addition of the remaining amount of the monomer emulsion mixture may be performed until the degree of conversion of the monomers reaches 80-90%.

In an embodiment, the remaining amount of the monomer emulsion mixture is added continuously over at least 60 minutes or 60-120 minutes.

In another embodiment, the remaining amount of the monomer emulsion mixture starts to be added at the time point at which the degree of conversion of the monomers is 5-10%, and is then added continuously over at least 60 minutes or 60-120 minutes or up to the time point at which the degree of conversion of the monomers reaches at least 60%.

As the aqueous polymerization initiator, any initiator may be used without particular limitation, as long as it may be used in the preparation of the graft copolymer of the present invention. Preferably, the aqueous polymerization initiator that is used in the present invention may be potassium persulfate, sodium persulfate, ammonium persulfate or butyl hydroperoxide.

In an embodiment, the aqueous polymerization initiator is added in an amount of 0.0001-0.1 parts by weight, 0.001-0.09 parts by weight, 0.01-0.05 parts by weight, or 0.018-0.036 parts by weight, based on 100 parts by weight of the total weight of the rubber latex, the vinyl aromatic monomer and the vinyl cyan monomer. If the aqueous polymerization initiator is added in an amount of less than 0.0001 parts by weight, there will be a problem in that radicals for initiating polymerization of the monomers are not sufficiently produced, and if the aqueous polymerization initiator is added in an amount of more than 0.1 parts by weight, there will be a problem in that an excessively large amount of radicals are undesirably produced such that polymerization will be terminated early.

In step (2) that is the second polymerization step, the assistant polymerization initiator is added in an amount of, for example, 0.0001-0.5 parts by weight, 0.001-0.4 parts by weight, 0.01-0.3 parts by weight, or 0.05-0.2 parts by weight, at the time point at which the degree of conversion of the monomers reaches 80-90%. If the assistant polymerization initiator is added in an amount of less than 0.001 parts by weight, there will be a problem in that radicals for initiating polymerization of the monomers are not sufficiently produced, and if the aqueous polymerization initiator is added in an amount of more than 0.5 parts by weight, there will be a problem in that an excessively large amount of radicals are undesirably produced such that polymerization will be terminated early.

The assistant polymerization initiator is an initiator having water solubility lower than that of the aqueous polymerization initiator that is added to initiate graft polymerization. In this case, the resulting ABS graft copolymer will have high gloss and impact strength, and the monomers will be grafted with high efficiency.

In an embodiment, the assistant polymerization initiator may be one or more selected from the group consisting of peroxides such as cumene hydroperoxide, diisopropylbenzene hydroperoxide, persulfates, etc.; and redox catalysts comprising reducing agents, for example, sodium formaldehyde sulfoxylate, sodium ethylenediamine tetraacetate, ferrous sulfate, dextrose, sodium picolinate, sodium sulfite, etc.

In an embodiment, in step (1) that is the mixing step or step (2) that is the first polymerization step, a molecular weight regulator may further be added in an amount of 0.0001-0.3 parts by weight, 0.0001-0.2 parts by weight, 0.0001-0.1 parts by weight, or 0.0001-0.01 parts by weight. If the molecular weight regulator is added in an amount of less than 0.0001 parts by weight or more than 0.3 parts by weight, there will be a problem in that the weight-average molecular weight of the prepared ABS graft copolymer is higher or lower than 50,000-100,000 g/mol, which is a weight-average molecular weight required in the final ABS graft copolymer.

The molecular weight regulator is preferably mercaptan, more preferably t-dodecyl mercaptan or n-octyl mercaptan, and most preferably t-dodecyl mercaptan.

The emulsifier may be suitably selected from among those that are used in graft copolymerization. In an embodiment, the emulsifier may be used in an amount of 0.01-10 parts by weight, 0.1-5 parts by weight, or 0.2-2 parts by weight. If the emulsifier is used in an amount of less than 0.01 parts by weight, there will be a problem in that the surface area increased by the formation of small particles is not sufficiently stabilized, and if the emulsifier is used in an amount of more than 10 parts by weight, there will be a problem in that surface clarity of the copolymer is reduced due to the emulsifier.

The rubber latex may be large-size rubber latex having a mean particle size of 1500 Å or larger, preferably 1500-5000 Å, more preferably 2500-5000 Å. The mean particle size may be measured using a particle size analyzer (Nicomp 380).

The rubber latex is used in an amount of 50-80 wt % (on a solid basis), 55-75 wt %, or 60-70 wt %, based on 100 wt % of the sum of the rubber latex, the aromatic vinyl compound and the vinyl cyan compound. Herein, the rubber latex may have a gel content of 50-95%, preferably 55-90%.

In an embodiment, the vinyl aromatic monomer that is used in the present invention may be selected from among styrene, α-methyl styrene, p-methyl styrene, and vinyl toluene, and may be used in an amount of 0.1-49.9 wt %, 10-40 wt %, or 10-30 wt %, based on 100 wt % of the sum of the rubber latex, the aromatic vinyl compound and the vinyl cyan compound.

In an embodiment, the vinyl cyan compound that is used in the present invention may be acrylonitrile or methacrylonitrile, and may be used in an amount of 0.1-49.9 wt %, 1-30 wt %, or 1-20 wt %, based on 100 wt % of the sum of the rubber latex, the aromatic vinyl compound and the vinyl cyan compound.

In an embodiment, the graft ratio of the graft copolymer may be 25-40%, 27-35%, or 28-32%. In this graft ratio range, the graft copolymer has excellent flowability and gloss.

After termination of the polymerization reaction, the degree of conversion of the monomers is, for example, 94% or higher, preferably 96% or higher, and more preferably 98% or higher.

The ABS graft copolymer that is prepared according to the present invention may have a weight-average molecular weight of, for example, 50,000-100,000 g/mol, 65,000-85,000 g/mol, 70,000-80,000 g/mol, or 70,000-79,000 g/mol.

The polymerization process for preparing the ABS graft copolymer according to the present invention is performed in a polymerization reactor under a nitrogen atmosphere at a temperature of 45 to 80° C. for 3-6 hours.

An ABS graft copolymer can be prepared by the method for preparing the ABS graft copolymer according to the present invention.

The ABS graft copolymer has a gloss of 91 or higher.

The graft copolymer latex prepared according to the preparation method of the present invention can be obtained as a powdery graft copolymer by adding an antioxidant and/or a stabilizer to the copolymer latex, and then coagulating the latex with an aqueous solution of sulfuric acid at a temperature of 70° C., 80° C. or 90° C. or higher, followed by dehydration and drying.

In a specific embodiment, the graft copolymer according to the present invention is an acrylonitrile-butadiene-styrene (ABS) resin.

Hereinafter, preferred examples will be described for a better understanding of the present invention. It is to be understood, however, that these examples are for illustrative purposes only, and those skilled in the art will appreciate that various changes and modifications are possible, without departing from the scope and spirit of the invention as disclosed in the accompanying claims.

Example 1: Preparation of Graft Copolymer

In the following description, the amounts of rubber latex, a vinyl aromatic monomer and a vinyl cyan monomer, which are used in the following reactions, are expressed in wt %, and the amounts of components other than the monomers are expressed in parts by weight based on 100 parts by weight of the total weight of the rubber latex, the vinyl aromatic monomer and the vinyl cyan monomer.

90 parts by weight of deionized water, 65 wt % (on a solid basis) of large-size butadiene rubber latex and 0.036 parts by weight of butyl hydroperoxide as an aqueous polymerization initiator were introduced into a polymerization reactor under a nitrogen atmosphere and mixed with one another to prepare a first mixture. Then, 5 wt % of the total amount of a monomer emulsion mixture, prepared by emulsifying 35 wt % of a second mixture of 26 wt % of styrene and 9 wt % of acrylonitrile with 0.5 parts by weight of an emulsifier and 10 parts by weight of deionized water, and 0.306 parts by weight of t-dodecyl mercaptan as a molecular weight regulator, were added all at once to the first mixture. Next, the internal temperature of the reactor was elevated to 72° C. to initiate polymerization of the monomers, and the remaining amount (30 wt %) of the monomer emulsion mixture was introduced continuously into the reactor over a time period ranging from the time point when the content of polymer particles calculated using the degree of conversion of the monomers reached 5 wt % to the time point when the degree of conversion of the monomers reached 85%. For continuous introduction, the remaining amount of the monomer emulsion mixture was placed in a syringe tube and introduced continuously into the reactor by means of a syringe pump such that introduction of the emulsion mixture was not cut off. When the degree of conversion of the monomers reached 85%, 0.12 parts by weight of cumene hydroperoxide was introduced into the reactor, and second-step polymerization was performed, and when the degree of conversion of the monomers reached 95%, the polymerization reaction was terminated, thereby preparing an ABS graft copolymer. An impact modifier, an antioxidant and other additives were added to the ABS graft copolymer in amounts that are generally used in the art, and the mixture was kneaded and processed (extruded and injection-molded) to prepare a specimen whose physical properties were to be measured.

Herein, the description of some particulars, which are generally known in the technical field to which the present invention pertain, and can be suitably selected or determined by those skilled in the art, if required, is omitted.

Example 2

The process of Example 1 was repeated, except that 10 wt % of the total amount (35 wt %) of the monomer emulsion mixture was added all at once in the first polymerization step, after which the remaining amount (25 wt %) of the monomer emulsion mixture started to be introduced from the time point when the content of polymer particles calculated using the degree of conversion of the monomers reached 10 wt %.

Example 3

The process of Example 2 was repeated, except that the emulsifier in 35 wt % of the second mixture of the vinyl aromatic monomer and the vinyl cyan monomer was used in an amount of 1 part by weight instead of 0.5 parts by weight.

Comparative Example 1

The process of Example 1 was repeated, except that the first-step polymerization reaction was performed after 35 wt % of the monomer emulsion mixture was added all at once to the first mixture.

Test Example

The properties of the ABS graft copolymers prepared in Examples 1 to 3 and Comparative Example 1 were measured in the following manner, and the results of the measurement are shown in Table 1 below.

Graft efficiency: calculated using the following equation 1 after dissolving each graft copolymer powder in tetrahydrofuran (THF)

Graft efficiency (%)=(weight of resin grafted onto rubber/weight of rubber)×100    Equation 1

Surface gloss: measured at an angle of 45° in accordance with ASTM D528.

Degree of conversion of monomer: measured by collecting a graft copolymer resin solution from a reactor, adding a 3-fold amount of methanol to the collected sample to precipitate the graft copolymer resin, vacuum-drying the graft copolymer resin solution, and measuring the weight of the remaining material. Herein, the degree of conversion measured by the precipitation method was corrected by measuring the content of unreacted monomer using gas chromatography (GC).

Coagulation rate (%): measured by filtering a latex resulting from reaction through a mesh, drying the filtrate in an oven at 80° C. for 24 hours, and measuring the mass of the remaining material.

Number of particles: calculated using the following equation after measuring the size of particles with a particle size analyzer (Nicomp 380) and measuring the solid content of the sample:

Solid content=number of particles×volume of single particle×density

TABLE 1

|  | Example 1 | Example 2 | Example 3 | Comp. Example 1 |
|---|---|---|---|---|
| Degree (%) of conversion (after 90 min of reaction) | 90.5 | 91.0 | 95.0 | 90.0 |
| Number of particles | 6.23 * 10$^{14}$ | 1.75 * 10$^{15}$ | 8.81 * 10$^{15}$ | 4.54 * 10$^{14}$ |
| Surface gloss | 91 | 94 | 100 | 90 |
| Graft efficiency (%) | 34.0 | 39.3 | 35.0 | 32.0 |
| Coagulation rate (%) | 0.04 | 0.03 | 0.09 | 0.04 |

From Table 1 above, it can be seen that, in Example 1 in which a portion of the monomer emulsion mixture was added all at once and the remainder monomer emulsion mixture was added continuously, the number of particles significantly increased compared to that in Comparative Example 1 in which the total amount of the monomer emulsion mixture was added all at once, suggesting that the degree of conversion of the monomers in Example 1 increased and the gloss in Example 1 also increased.

In addition, in Example 2 in which the amount of monomer emulsion mixture added all at once was increased compared to that in Example 1 and the amount of monomer emulsion mixture added continuously was reduced, the number of particles significantly increased and the degree of conversion and the gloss also increased, compared to those in Example 1.

Figure 2:
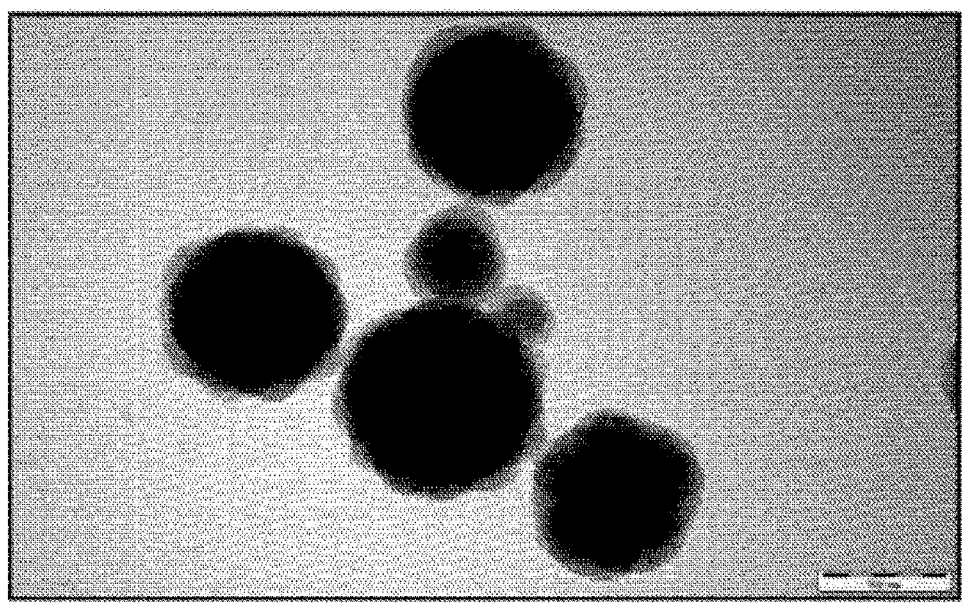
FIG. 2 is a TEM photograph of an ABS graft copolymer prepared in Example 2 of the present invention.
Figure 3:
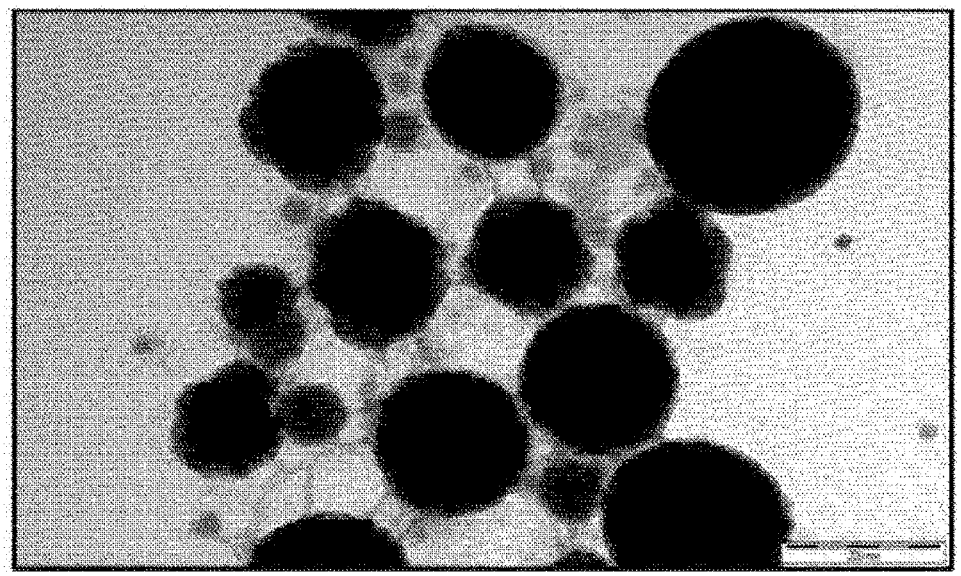
FIG. 3 is a TEM photograph of an ABS graft copolymer prepared in Example 3 of the present invention.
Figure 4:
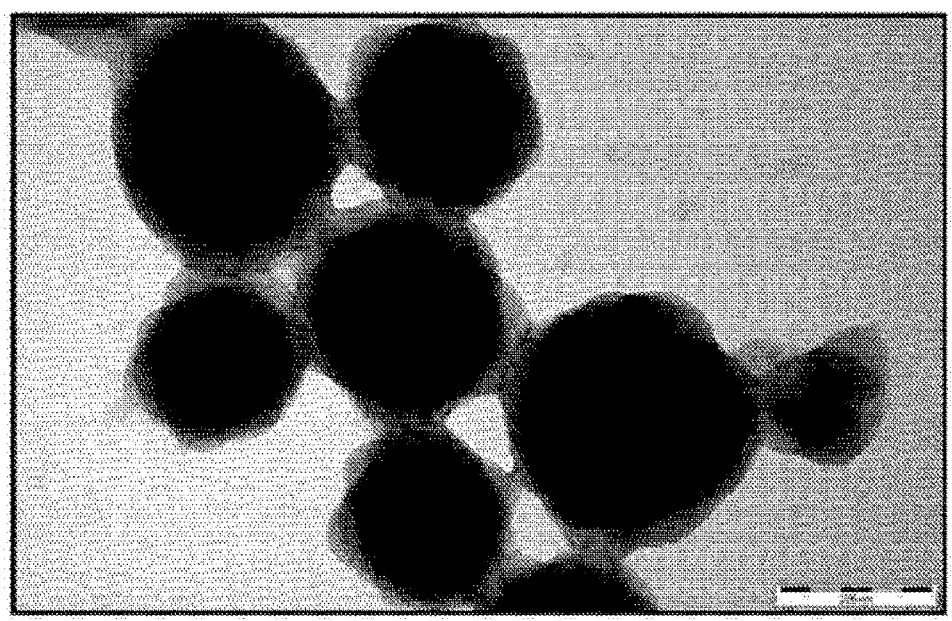
FIG. 4 is a TEM photograph of an ABS graft copolymer prepared in Comparative Example 1 of the present invention.

Moreover, this tendency of increase was more evident in Example 3 in which the amount of emulsifier used was increased compared to that in Example 2. This indicates that the emulsifier promoted the formation of small SAN particles, and the degree of conversion and the gloss were increased due to these SAN particles. This can also be seen in transmission electron microscope photographs of FIGS. 1 to 4. As can be seen therein, the number of small particles in FIGS. 1 to 3 showing the results of Examples 1 to 3 was larger than that in FIG. 4 showing the results of Comparative Example 1.

What is claimed is:

1. A method of preparing an acrylonitrile-butadiene-styrene (ABS) graft copolymer by graft-copolymerizing a vinyl aromatic monomer and a vinyl cyan monomer onto rubber latex, the method comprising the steps of:
   (1) adding, based on 100 parts by weight of the total weight of the rubber latex, the vinyl aromatic monomer and the vinyl cyan monomer, 0.0001-0.1 parts by weight of an aqueous polymerization initiator to 50-80 wt % (on a solid basis) of the rubber latex, and mixing the polymerization initiator with the rubber latex to prepare a first mixture;
   (2) adding 5-10 wt % of the total amount of a monomer emulsion mixture, prepared by emulsifying 20-50 wt % of a second mixture of the vinyl aromatic monomer and the vinyl cyan monomer with, based on 100 parts by weight of the total weight, 0.01-10 parts by weight of an emulsifier, to the first mixture, initiating polymerization of the monomers, and then adding the remaining amount of the monomer emulsion mixture, and performing polymerization of the monomers; and
   (3) adding, based on 100 parts by weight of the total weight, 0.0001-0.5 parts by weight of an assistant polymer initiator during polymerization of the monomers at a time point when a degree of conversion of the monomers reaches 80-90%, and performing polymerization of the monomers.

2. The method of claim 1, wherein 5-10 wt % of the total amount of the monomer emulsion mixture is added all at once.

3. The method of claim 1, wherein the adding of the remaining amount of the monomer emulsion mixture is started at a time point when a content of polymer particles calculated using the degree of conversion of the monomers reaches 5-10 wt %.

4. The method of claim 1, wherein the adding of the remaining amount of the monomer emulsion mixture is performed in a continuous manner.

5. The method of claim 4, wherein the adding of the remaining amount of the monomer emulsion mixture in the continuous manner is started at the time point when the content of polymer particles calculated using the degree of conversion of the monomers reaches 5-10%, and is continued over at least 60 minutes.

6. The method of claim 1, wherein the aqueous polymerization initiator is one or more selected from the group consisting of potassium persulfate, sodium persulfate, ammonium persulfate, and butyl hydroperoxide.

7. The method of claim 1, wherein the assistant polymerization initiator is one or more selected from the group consisting of cumene hydroperoxide, diisopropylbenzene hydroperoxide, persulfate, sodium formaldehyde sulfoxylate, sodium ethylenediamine tetraacetate, ferrous sulfate, dextrose, sodium picolinate, and sodium sulfite.

8. The method of claim 1, wherein a molecular weight regulator is further added in step (1) or (2) in an amount of 0.0001-0.3 parts by weight.

9. The method of claim 8, wherein the molecular weight regulator is t-dodecyl mercaptan, n-octyl mercaptan, or a mixture thereof.

10. The method of claim 1, wherein the rubber latex has a mean particle size of 1500-5000 Å.

11. The method of claim 1, wherein the vinyl aromatic monomer is one or more selected from the group consisting of styrene, a-methyl styrene, p-methyl styrene, and vinyl toluene.

12. The method of claim 1, wherein the vinyl cyan compound is acrylonitrile, methacrylonitrile, or a mixture thereof.

\* \* \* \* \*